United States Patent [19]

Pond

[11] 4,030,104

[45] June 14, 1977

[54] THERMO-MAGNETIC IMAGE TRANSFER APPARATUS

[75] Inventor: Stephen F. Pond, Fairport, N.Y.

[73] Assignee: Xerox Corporation, Stamford, Conn.

[22] Filed: Nov. 12, 1975

[21] Appl. No.: 631,006

[52] U.S. Cl. ................................ 346/74.1; 240/1.3; 240/11.4 R; 240/51.11 R; 360/16; 360/59

[51] Int. Cl.$^2$ .................. G11B 11/14; G11B 5/027; G03B 15/05

[58] Field of Search ............... 360/59, 16; 313/110, 313/113, 114; 240/103 R, 41.35 R, 41.35 C, 11.4 R, 51.11 R, 1.3; 355/113; 346/74.1

[56] References Cited

UNITED STATES PATENTS

| | | | |
|---|---|---|---|
| 3,484,597 | 12/1969 | Schmidt | 240/11.4 R |
| 3,613,102 | 10/1971 | Daly | 360/16 |
| 3,786,247 | 1/1974 | Eilert | 240/1.3 |
| 3,788,560 | 1/1974 | Hough | 240/51.11 R |
| 3,832,540 | 8/1974 | Roth | 240/51.11 R |
| 3,936,672 | 2/1976 | Tanaka | 240/11.4 R |
| R27,685 | 6/1973 | Nelson | 360/16 |

*Primary Examiner*—Jay P. Lucas

*Attorney, Agent, or Firm*—James J. Ralabate; Richard A. Tomlin; George J. Cannon

[57] ABSTRACT

A thermoremanent imaging apparatus for magnetically recording graphic information is disclosed. An elongated light source with a substantial infra-red and visible radiation spectrum is used to produce a high energy flash exposure of a magnetic surface. The light source is co-axially located within a transparent cylindrical transport means which carries the magnetic surface around its periphery. A uniform intensity of energy from the flash exposure over the entire magnetic surface is provided by reflective energy deflecting means placed in opposition along the axis of the transport means.

6 Claims, 18 Drawing Figures

THERMO-MAGNETIC IMAGE TRANSFER APPARATUS

CROSS REFERENCE TO RELATED CASES

The present application is related to a co-pending application entitled, "Magnetic Imaging Apparatus", Ser. No. 631,289, filed Nov. 12, 1975 in the names of E. Faucz and S. Pond and assigned to the assignee of the present invention.

BACKGROUND OF THE INVENTION

1. Field of the Invention

The invention pertains generally to the thermoremanent formation of a graphic image on a magnetizable surface and more particularly to a flash lamp configuration including means for uniformly irradiating the magnetizable surface.

2. Prior Art

Recently, there was developed an advantageous full frame thermoremanent transfer station for a magnetic imaging system. This transfer station, its utilization, and advantages are more fully described in the above referenced co-pending application, the disclosure of which is herein incorporated by reference.

The transfer station utilizes a transparent cylindrical carriage means to provide a full frame thermomagnetic transfer from a slave web to a master web. Coaxially located within the cylinder is an elongated flash lamp that produces the energy flash necessary for the transfer. Also provided are dual web transport rollers, each co-acting with a corresponding locking assembly.

Although, the transfer station configuration disclosed solves many of the problems found in the prior art of flash transferring an image including timing, registration, slippage, and spacing difficulties, it could be improved by providing a means to insure the uniformity of the energy profile from the flash lamp over the entire magnetic transfer surface.

Generally, this problem has not been addressed by the prior art because the thermomagnetic copying process has been thought of as threshold in nature. The theory was as long as all magnetic areas to be erased or written were heated beyond the Curie temperature there was no necessity to reduce the differential in energies one area might incur in relation to another.

However, it has been found that the uniformity of exposure in a thermomagnetic imaging system is important. If the exposure is uniform, the process becomes more efficient as the peak energy output from the flash lamp can be adjusted to heat the material just beyond the Curie temperature. Normally, the peak output must be somewhat higher to allow for the flash lamp envelope non-uniformity at the edges of a transfer document. Another advantage of uniformity is that if the lower peak power is used in imaging, the magnetic surface will cool faster.

Primarily, the need for uniformity of the energy profile is produced by the material constraints of the imaging system used. The masks used for thermomagnetic imaging are usually opaque in image areas and must absorb the energy radiations from the flash lamp to mask premagnetized surfaces. If the energy profile is relatively uniform across the recording surface, the masks may have a lower optical density than if differentials of high peak energies and illuminations had to be deflected. Also, the particular materials used in the imaging process are not so critical as much less heat need be absorbed by the opaque masking materials.

SUMMARY OF THE INVENTION

Accordingly, it is the object of the invention to produce a relatively uniform energy profile across substantially the entire recording surface of a thermomagnetic imaging system.

This object and others are accomplished, according to the invention, by utilizing a radiation source coaxially located within a cylindrical carriage means which transports the recording surface around its periphery. A uniform intensity of energy over substantially the entire recording surface from a flash exposure by the radiation source is provided by reflective energy deflectors placed in opposition along the axis of the cylindrical transport means. In one form the energy deflectors are planar reflective surfaces on a substrate mounted parallel to each cylinder end. In a second form the energy deflectors are convex reflective surfaces on a substrate mounted at each cylinder end pointing inwardly.

BRIEF DESCRIPTION OF THE DRAWINGS

These and other objects, features, and aspects of the invention will become clearer and more fully apparent from the following detailed description when read in conjunction with the accompanying drawings, wherein.

DETAILED DESCRIPTION OF THE PREFERRED EMBODIMENTS

Figure 1A:
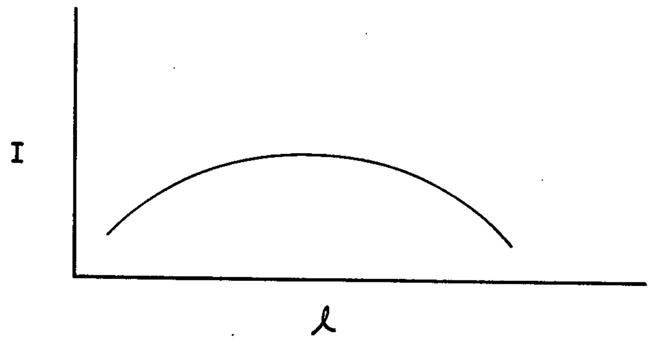
FIG. 1*a* is an illustrative planar representation of an energy profile graphically depicting the intensity of energy on the surface of a cylindrical carriage means as a function of the length of the cylinder.
Figure 1B:
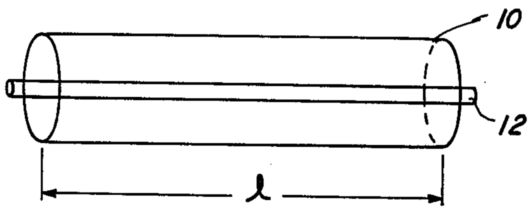
FIG. 1*b* is a schematic representation of the cylindrical carriage means producing the energy profile of FIG. 1.

With reference now to FIG. 1*a* there is shown an energy profile, in one plane, for a transparent cylindrical carriage means 10 and a flash tube 12 configuration as that illustrated in FIG. 1*b* and disclosed in the cross referenced application. It is seen that the intensity I of the energy profile along the cylinder surface as a function of the length L of the cylinder 10 peaks at the center of the tube 12 and falls off as one travels away from the center of the tube. Theoretically it has been determined, for a configuration as that shown in FIG. 1*b* with a length to radius (L/R) ratio of approximately 8, that the effect should be approximately 40percent drop off between peak energy at the center of the cylinder and the minimum energy at the edges. There are two explanations for the shape of the energy profile. Since the flash is randomly directed, it is believed that those energy waves generated at a low angle with respect to the flash tube exit the ends without contacting the surface. Also, the effect of having an electrode at each end of the flash tube produces a greater ionization toward the center. Therefore, if one wants to image a magnetizable surface at the edge of the cylinder 10 the peak power produced by the flash tube has to be increased to raise the minimum energy seen at the edges to a level that will allow the surface to be erased.

Figure 2A:
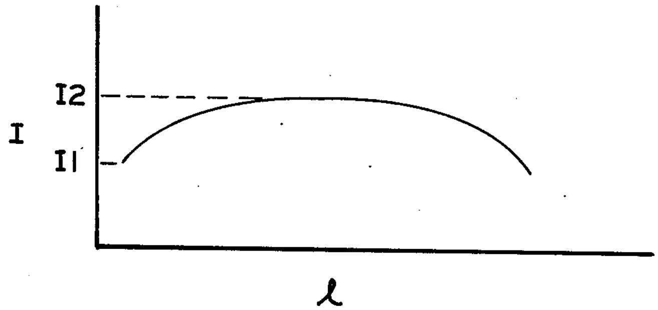
FIG. 2*a* is another illustrative planar representation of an energy profile graphically depicting the intensity of energy on the surface of a second, larger cylindrical carriage means as a function of the length of the cylinder.

For larger documents or for a concatenated series of smaller documents transferred in a full frame thermomagnetic transfer, greater cylinder diameters must be used and therefore larger peak energies must be provided to transfer the images at greater distances. A larger transparent carriage cylinder 14 is shown with a coaxially located flash tube 16 in FIG. 2*b*. However, for this configuration, as is graphically depicted in FIG. 2*a*, the peaking effect becomes somewhat less pronounced in relation to larger diameter cylinders than with the smaller cylinders of FIG. 1*b*. It is believed that the length to radius ratio (L/R) will dominate the profile with higher L/R ratios (FIG. 1*b*) showing more peaking. Theoretically, the maximum peaking that will occur for a very large L/R ratio is a 50 percent difference between the ends and the center. FIG. 2*a* illustrates the intensity I of the energy profile along the cylinder surface as a function of the length *l* of the cylinder 14. Theoretically, the cylinder 14 with a L/R ratio of 4 as that shown should exhibit approximately a 33 percent drop off between peak energy at the center of the cylinder and the minimum energy at the edges. However, for cylinder having a diameter of approximately 70mm (R approximately 1.5 in.) and a length of 6.0 in. and using a flash tube having a diameter of 6mm and a length of 6 in. the actual effect has been measured as approximately 25 percent drop off between peak energy at the center of the cylinder and the minimum energy at the edges. The cause for this observed difference is not fully understood. The power and material requirements for this system are difficult to meet because the differential between the peak power and that needed at the edge are still a substantial percentage of a large quantity. Therefore, the mask in image areas must use relatively high optical densities and be able to dissipate substantial amounts of incident energy.

Figure 2B:
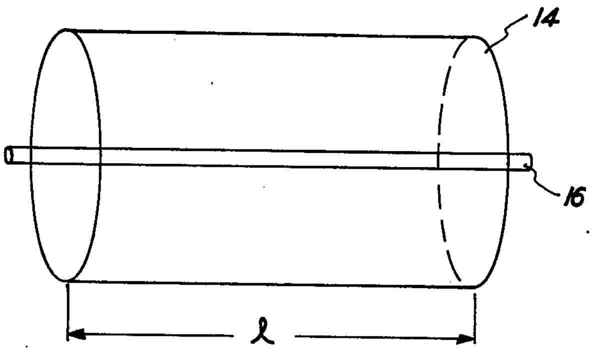
FIG. 2*b* is a schematic representation of the cylindrical carriage means producing the energy profile of FIG. 3.

The difference in the incident energies along the surface of the carriage cylinder 14 can be defined as the distance 12-I1 in FIG. 2*b*. If this difference can be made more uniform (smaller) or eliminated altogether, the image mask may have a lower optical density in image areas and also dissipate less absorbed energy. To graphically verify this premise reference is given to FIG. 3. If it is assumed that the radiant energy from the flash lamp is either substantially absorbed or transmitted by the mask of the imaging webs one obtains the general equation for this phenomenon as follows: The incident energy I from the flash lamp times the transmissivity T of the area is equal to the energy E that is received on the recording surface of a web or rewriting the expression $I = (1/T \times E$. The transmissivity of a certain material is directly related to the optical density of that material by the equation $-\log T = OD$ where $T$ is transmissivity, log T is to the base 10 and OD is the optical density. The transmissivity values of a material range from 0 to 1 where a value of 0 indicates a perfectly opaque material and a value of 1 is equivalent to a perfectly transparent object which passes 100 percent of the light incident thereon.

Figure 3:
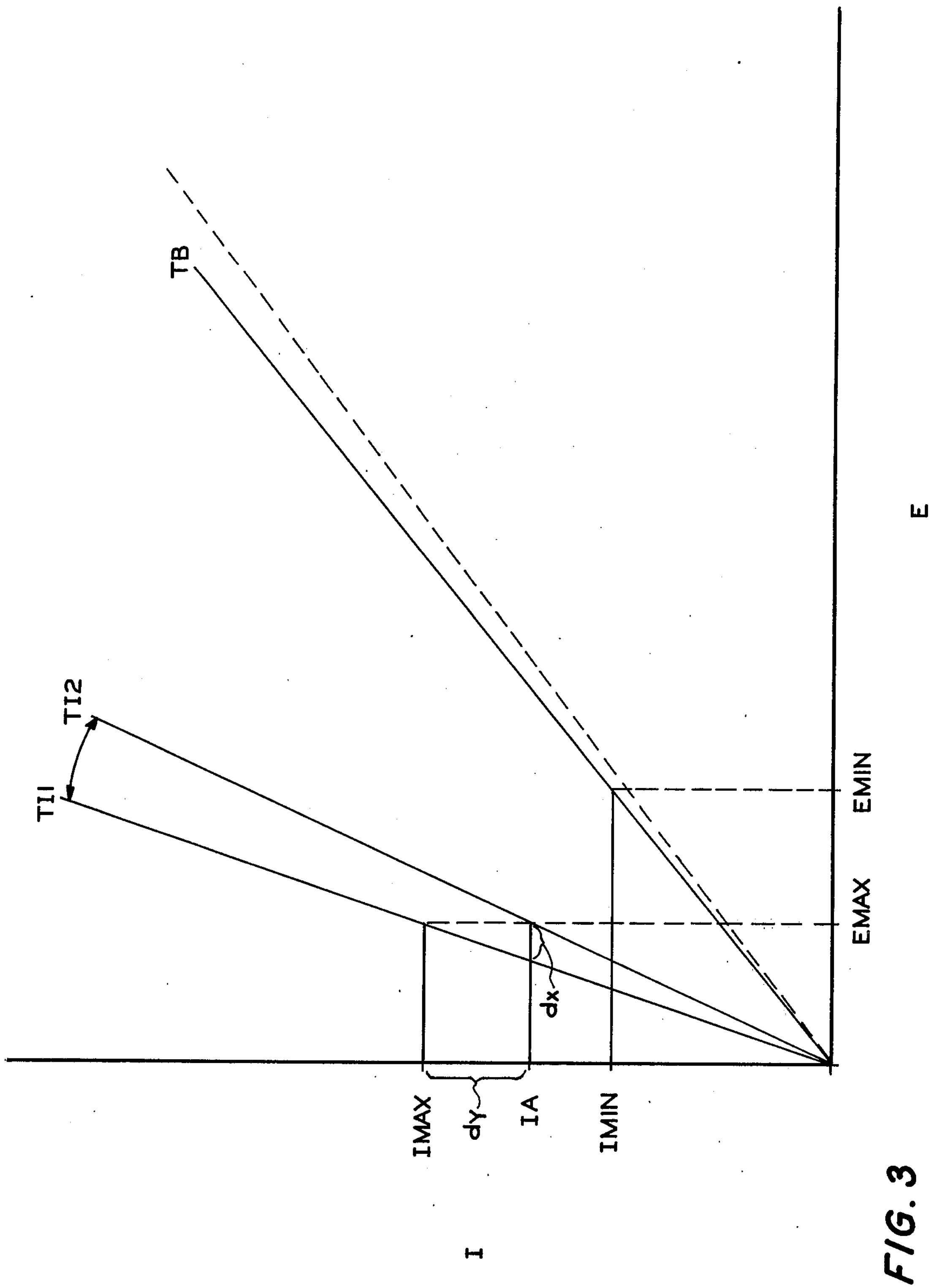
FIG. 3 contains graphical representations of Intensity I as a function of Received energy E for a transparency having differing areas of optical density.

Referring now to the graphical FIG. 3, $I = (1/T)\ E$ plots have been made showing the incident energy I in relation to the energy received on the recording surface for a series of constant transmissivities. The dotted line is at 45° and illustrates a perfect transmissivity of 1and curves increasing in slope towards the ordinant are values of decreasing transmissivity. For a transparency having differing areas of optical density a graph for the transparent or the background areas of the masking web for the maximum optical density therein is a line TB and a graph for the image areas of the masking web for the minimum optical density therein is a line TII. It is noted, of course, that image areas have a greater optical density or a smaller transmissivity then the non-imaged areas and therefore TII is closer to the ordinant than TB.

For these graphs then, there are two important energy values EMAX and EMIN. EMIN is the lowest energy level received through the tranparent areas of the masking web that will erase the pre-recorded master. If lower energies than EMIN are provided after passing through the transparent areas then the erasure of the pre-recorded master in background areas will not be produced. The corresponding value for EMIN (from curve TB) is IMIN which is the lowest incident energy from the flash lamp that the web combination must see to readily image a pre-recorded master web.

The second imporant parameter is the EMAX value which indicates the maximum value of energy that may be transmitted through the image areas of the mask without erasing the pre-recorded signal on the master web in image areas. This value then corresponds to IMAX (from TII). IMAX therefore is the greatest value of incident energy the web combination may have impinged upon its surface without erasing the image areas of the master web.

These two values are the range, IMIN to IMAX, which the incident energy of the flash lamp must fall between. To provide for the removal of background in all non-image areas of the webs, the minimum energy of the flash lamp (II of FIG. 2) must exceed IMIN of FIG. 3. Since IMIN corresponds to II of FIG. 2, the I2 of FIG. 2 cannot exceed the IMAX of FIG. 3 or the system will erase image areas and not image correctly.

The designer must raise the optical density (lower transmissivity) in the image area of the masking web so that I2 of the lamp configuration used will not exceed IMAX for the web combination.

For masks having almost transparent ($T=1$) background areas, IMIN is approximately equal to EMIN and is a parameter of the material used in the magnetic surface of the master web. If one could then reduce the differential between I2 and I1 the differential between IMAX and IMIN could be reduced correspondingly by lowering the optical density in the image areas of the masking web say to a curve TI2 shown in FIG. 3. The incident energy needed at the peak therefore would be IA and the masking material would have to dissipate a lower differential in energy (IA ' IMIN).

The object of lowering the differential in energy between I1 and I2 and thereby providing a substantially uniform irradiation of the web combination is accomplished in accordance with the invention by using energy deflecting means at each cylinder end. The energy deflecting means reflect energy produced by the flash tube onto the edge areas and increase the incident energy thereon to level the profile across the cylinder surface. For a smaller cylinder (FIG. 1*a*) a planar deflecting means is used and for larger cylinders (FIG. 2*a*) a convex or planar deflecting means is used. The energy deflecting means are most conveniently used in their preferred form in the novel TRM transfer station described in its entirety in the referenced related application.

The novel TRM transfer station 32 will now be more fully described with reference to the partially broken away view of FIG. 4. For ease in description and to more clearly see the advantages of the transfer station 32 the sandwiched web configuration is not shown around the cylindrical carriage cylinder 35. In this Figure there is illustrated the transparent cylindrical carriage means 35 which takes the form of a transparent drum. The carriage cylinder 35 may be made out of a plurality of materials including a high quality heat resistant glass such as Pyrex or a transparent plastic such as Lexan. Inserted in each end of the drum is an end cap 50 held in place by a lip or rim and having a centrally located aperture therethrough. Into each aperture of the end caps is press fitted a coaxially bearing 54 in the form of a thrust bushing or the like. The bearing 54 allows the transparent carriage cylinder 35 to rotate on a cylindrically shaped sleeve 56 which is force fitted through an aperture in a base member 59 of the TRM station. The bearing 54 allows the cylinder to rotate easily without producing a substantial amount of drag or frictional contact on the web combination.

Through the inner portion of the sleeve 56 and coaxial with the rotatable carriage cylinder 35 is the flash lamp 26. The flash lamp 26 comprises an electrode 51 on each end which terminates into a conductive mounting cap 57. The mounting cap provides a convenient way to securely fasten the flash lamp into a conductive metal clip 66 which is anchored to a support 67 of the base member 59. Mounting the flash tube in this manner through the sleeve 56 allows the tube to be easily removed and further permits the cylinder 35 to rotate independently while the flash tube 26 remains stationary. The sleeve also produces an important function of providing an aperture whereby an air current may carry the heat developed by the flash lamp away from the inner portion of the cylinder. The clip 66 also retains a high voltage cable 69 with a connector or the like. A single flash of the lamp 26 can most conveniently be accomplished by closing a switch between the lamp and a charge of high voltage through the cable 69. The stored voltage of a parallel capacitor is usually used to cause the breakdown or ionization of the gas encased in the tube and provide the short duration high energy burst or flash that is needed for the thermomagnetic transfer.

Voltages in the range of 2000–3000 volts can be used and a capacitor of between 60–100 $\mu$f is an advantageous choice. The burst of energy emanating from the flash lamp is then on the order of 2–3 $\times 10^6$ ergs/cm$^2$ on a cylinder surface having a diameter of 2.75 ins. for a duration of approximately 150 $\mu$sec. A flash lamp that can be utilized in this process is a 6L6 lamp produced by ILC Corporation of Sunnyvale, Calif.

Providing for a snug grasp of the sandwiched master slave web combination is the web transfer roller 33 which comprises an inner shaft 90 and, on each end, a roller shaft 92. The roller shaft 92 is journeled in a sleeve bearing 94 that has been press fitted through the support member 59. The inner shaft 90 is covered with a soft outer layer 88 which may be a rubber tubing placed over the shaft 90. To give a better grip on the web combination, the outer layer 88 may be corrugated or have a gripping pattern on the outside surface. It is important however that the outside layer 88 be soft and not scratch or abraid the web surfaces.

The transfer rollers are powered by gear 93 which is meshed with a gear 95 powered by a motor 91. The gearing and motion of the rollers 31, 33 are better illustrated with reference to FIG. 4*a* where there is shown the drive gear 93 and an opposite drive gear 103. These gears 93, 103 are driven synchronously by meshing with the power gear 95 of the motor 91 (shown schematically). A protective housing 112 is used to protect personnel from the high voltage electrodes of the flash lamp 26. With references again to FIG. 4, there is located above each web transport roller 33 a locking assembly comprising a locking bar 96 having a soft locking surface 97 adhered thereto. The locking bar 96 moves vertically in a reciprocating fashion in a slot 98 in the base member 59 of the TRM station 32. Aligning the locking bar 96 along the length of the transport rollers are studs 70 threaded into the locking bar and positioned through apertures 82, 84 and 86 in a tranverse support member 102. The support member 102 provides a biasing force against which bias springs 76, 78 and 80 push. A force 101 (schematically illustrated) is used to retain the locking bar 96 against the bias spring pressure when not in use. This force may be an air piston, another stronger bias spring, or other conventional means known in the art. The force is released when the locking bar is to be used to hold the webs onto the rollers 31 and 33.

Figure 4:
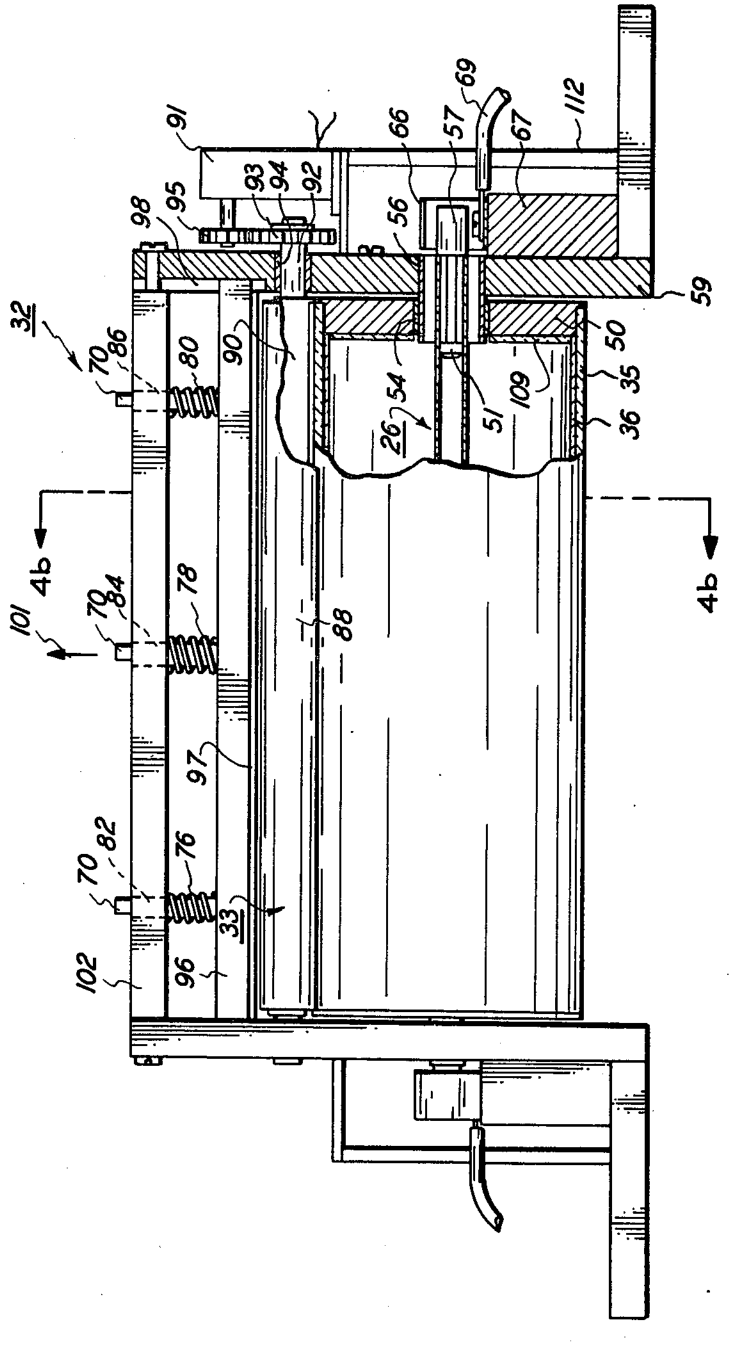
FIG. 4 is a partial breakaway view in front elevation of a novel thermomagnetic transfer station having energy deflecting means constructed in accordance with the invention.
Figure 4A:
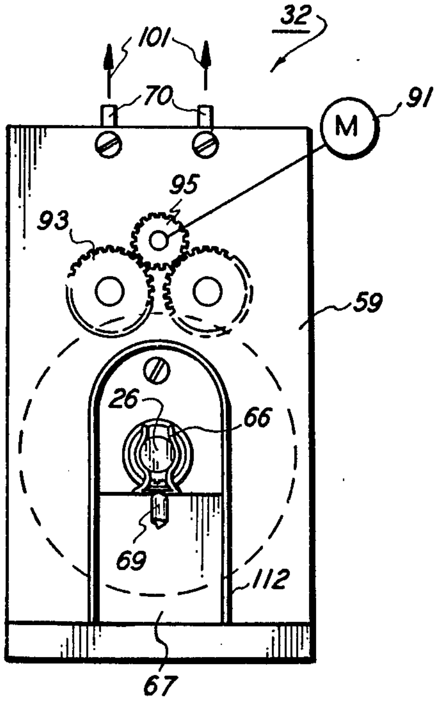
FIG. 4*a* is an end view of the novel thermomagnetic transfer station illustrated in FIG. 4.
Figure 4B:
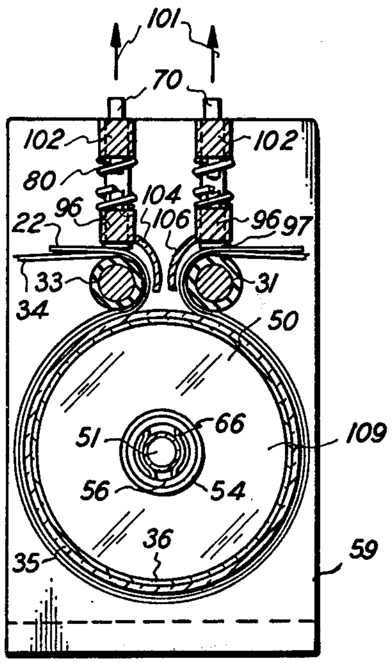
FIG. 4*b* is a cross-sectional view of the novel thermomagnetic transfer station sectioned along line 4*a*—4*a* in FIG. 4.

The sectioned FIG. 4*b* better illustrates the relationship of the locking bar 96, transverse support member 102 and locking surfaces 97. The imaged slave web 22 which forms a transparency having differing optical densities in image and non-image areas and the master web 34 are transported around the rollers 31, 33 and cylindrical carriage cylinder 35 in a full frame exposure configuration and guides 104 and 106 prevent the webs from bunching and slipping off the rollers 31 and 32. When the image is in place and ready to be transferred by the TRM station 32 the force 101 which is holding the locking bars 96 up is de-energized and the locking assemblies under the power of the biasing springs lock the web onto the rollers to provide a set registration. The two sandwiched webs then remain motionless in relationship to one another while the flash is taking place. After the positioning has taken place, the transfer is accomplished by the single flash of the lamp 26, thereafter, the locking assemblies are released by energizing the holding force 101 and the webs may move independently once more.

ENERGY DEFLECTING MEANS

The energy deflecting means are illustrated to advantage in FIG. 4 where in the breakaway, one is shown as 109. The opposite end of the carriage means 35 has a similarly mounted opposing deflecting means. The deflecting means 109 take incident energy falling upon them and deflect this energy back onto the cylindrical surface. A front view of energy deflecting means 109 is shown in FIG. **4*b* where it can be seen that the deflecting means covers the entire end of the cylindrical carriage means and has an opening for the sleeve 54.**

Figure 5:
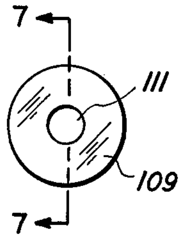
FIG. 5 is a front view of one embodiment of the energy deflecting means of the thermomagnetic transfer station of FIG. 3.
Figure 7:
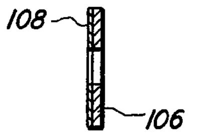
FIG. 7 is a cross-sectional view of the energy deflecting means illustrating in FIG. 5 and sectioned along line 7—7 in that Figure.

Preferably, the energy deflector 109 can be a mirror surface silvered on the end cap 50 but may also be a mirror surface on its own independent supporting substrate. The energy deflector 109 is illustrated dismounted from the carriage cylinder 35 in FIG. 5 where it is shown as generally circular with a centrally located circular aperture 111 for mounting the sleeve of the carriage cylinder therethrough. The deflector 109 is shown having a flat planar cross section in FIG. 7 with the mirror surface 108 being layered on a substrate 106. An energy profile will have more incident energy at the edges from the reflection of incident light rays on the mirror surface 108 being deflected onto the recording surface.

Figure 6:
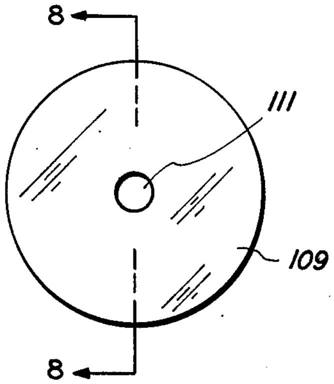
FIG. 6 is a front view of a second embodiment of the energy deflecting means of the thermoremanent transfer station of FIG. 3.
Figure 8:
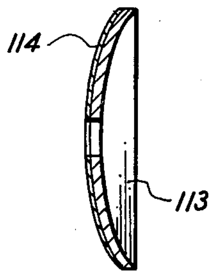
FIG. 8 is a cross-sectional view of the energy deflecting means illustrated in FIG. 6 and sectioned along line 8—8 in the Figure.

For larger diameter cylinders it is seen that a second embodiment of the energy deflecting means 109 shown in FIG. 6 can be used. This energy deflecting means 109 is better shown in cross section in FIG. 8 as being sectioned along lines 8—8 where it comprises a mirror surface 114 on a supporting substrate 113. The surface 114 is illustrated as generally convex similar to the truncation of a spherical surface. In the second embodiment the deflecting means would be mounted inwardly pointing at opposite ends of the cylindrical carriage means thereby deflecting the randomly generated energy from the lamp onto the cylindrical surface. It is believed more energy will be deflected onto the surface with this convex configuration and the curvature will be related to the diameter of the cylinder.

FIGS. **9*a–f* pictorially represent areas of magnetic webs that have been erased with the transfer station 32. The light areas represent erasures and the dark areas remanent magnetization. The magnetic web used was a Crolyn recording tape that had been pre-recorded with a $50\mu$ wavelength. A TRM station 32 with a L/R ratio of approximately 4 and having the previously measured 25percent peak to edge drop off was flashed at three different energy levels to produce the results shown. Planar deflecting means, such as those shown in FIG. 5,** of aluminized plastic were placed in opposition along the axis as described herein before. It is believed that a highly polished reflector of pure aluminum would be an equally advantageous choice.

Figure 9A:
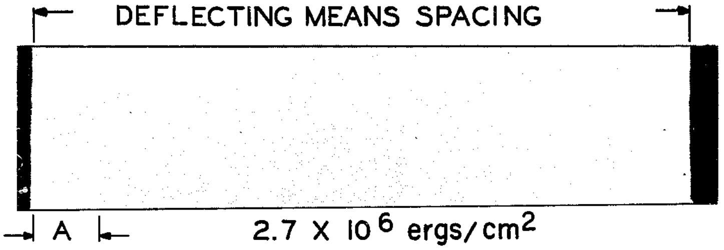
FIG. 9*a–f* are pictorial representations of magnetic web surfaces erased at three different energy levels with and without the deflecting means of FIG. 5.
Figure 9B:
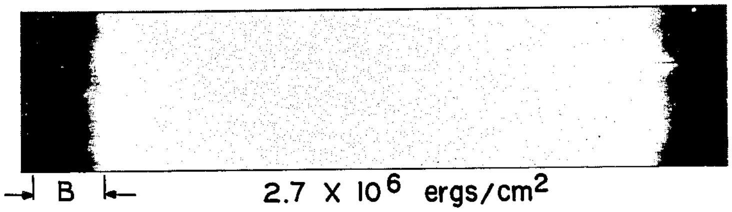

FIG. **9*a* illustrates a transverse strip of web along the length of the cylinder with the deflectors in place. A complete erasure to the edges of the web has been accomplished. FIG. 9*b* is an erasure at the same energy level ($2.7 \times 10^6$ ergs/cm$^2$) as that of FIG. 9*a*** but without the deflecting means in place. It is noted the difference in the areas (A,B) erased are due the energy deflecting means.

Figure 9C:
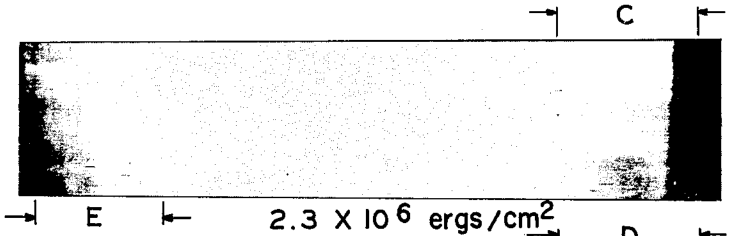
Figure 9D:
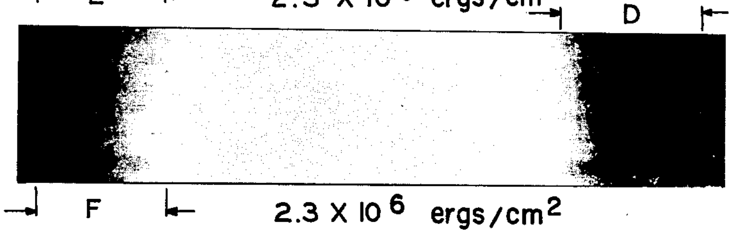

FIGS. **9*c* and 9*d* show similar results for a lower energy level of $2.3 \times 10^6$ ergs/cm$^2$. FIG. 9*d* illustrates only partial erasure in area C while area D of FIG. 9*c*** is substantially erased with the deflecting means in place. The areas E and F are not considered valid for comparison.

Figure 9E:
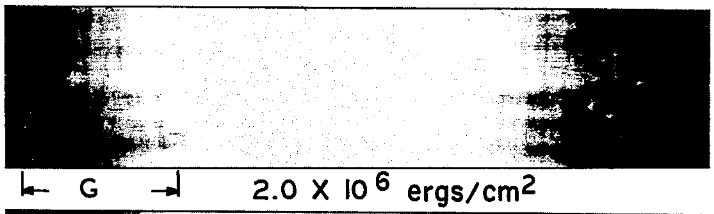
Figure 9F:
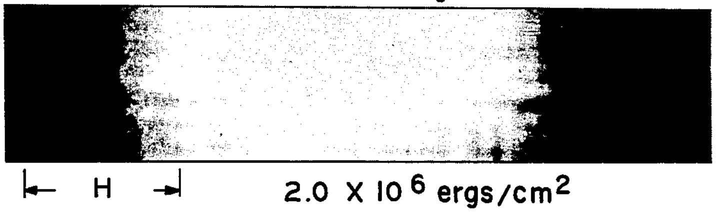

FIGS. 9*e* and 9*f* illustrate the system at an energy level ($2.0 \times 10^6$ ergs/cm$^2$) that is approaching the threshold limit of the web. Some additional erasure is seen in area G (FIG. 9*e*) with the deflecting means in place over area H (FIG. 9*f*) without the deflecting means.

While the invention has been described in detail in relation to a number of preferred embodiments, those skilled in the art will understand the other changes in form and detail may be made therein without departing from the spirit and the scope of the invention wherein all such changes obvious to one skilled in the art are encompassed in the following claims.

What is claimed is:

1. A thermoremanent transfer apparatus for thermomagnetically transferring an image from a slave web onto the magnetizable surface of the master web comprising:

a transparent cylindrical carriage means, web transport means cooperating with said carriage means for transporting said slave web and said master web into intimate contact around substantially the entire periphery of said carriage means;

a radiation source located within said carriage means for producing a thermomagnetic transfer of the image from the slave web onto the master web, and;

energy deflecting means for reflecting energy from said radiation source onto the surface of said carriage means to provide a substantially uniform irradiation over the entire surface.

2. A thermoremanent transfer apparatus as defined in claim 1 wherein said energy deflecting means comprise mirror surfaces at opposing ends of said cylindrical carriage means.

3. A thermoremanent transfer apparatus as defined in claim 2 wherein said energy deflecting means comprise a planar mirror surface parallel with said cylindrical end.

4. A thermoremanent transfer apparatus as defined in claim 3 wherein each deflecting means has a centrally located aperture for mounting said radiation source therethrough and for permitting an airflow through said cylindrical carriage means.

5. A thermoremanent transfer apparatus as defined in claim 2 wherein said deflecting means comprises a convex mirror surface pointing inwardly and coaxial with said cylinder at each end.

6. A thermoremanent transfer apparatus as defined in claim 5 wherein each deflecting means has a centrally located aperture for mounting said radiation source therethrough and for permitting an airflow through said cylindrical carriage means.

* * * * *